United States Patent
Scott et al.

(10) Patent No.: US 9,398,367 B1
(45) Date of Patent: Jul. 19, 2016

(54) SUSPENDING NOISE CANCELLATION USING KEYWORD SPOTTING

(71) Applicant: Amazon Technologies, Inc., Reno, NV (US)

(72) Inventors: Benjamin David Scott, Cambridge (GB); Mark Edward Rafn, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 14/341,222

(22) Filed: Jul. 25, 2014

(51) Int. Cl.
*A61F 11/06* (2006.01)
*G10K 11/16* (2006.01)
*H03B 29/00* (2006.01)
*H04R 3/02* (2006.01)
*H04R 1/10* (2006.01)
*H04B 15/00* (2006.01)

(52) U.S. Cl.
CPC .......... *H04R 1/1083* (2013.01); *H04R 2460/01* (2013.01)

(58) Field of Classification Search
CPC ........ A61F 11/06; G10K 11/175; H04R 1/10; H04R 1/28; H04R 1/1083; H04R 1/1091; H04R 5/033; H04R 25/00; H04R 25/75; H04R 2400/01; H04R 2410/00; H04R 2410/01; H04R 2460/01
USPC ........ 381/41, 42, 43, 46, 71.1, 71.6, 72, 73.1, 381/74, 94.1, 370
See application file for complete search history.

(56) References Cited

U.S. PATENT DOCUMENTS

| | | | | |
|---|---|---|---|---|
| 5,812,659 A * | 9/1998 | Mauney | .................. | H04M 1/05 379/430 |
| 7,068,798 B2 * | 6/2006 | Hugas | ................. | G10L 21/0208 381/86 |
| 8,504,360 B2 * | 8/2013 | Pedersen | ............. | G10L 21/0208 381/73.1 |
| 9,031,250 B2 * | 5/2015 | Ookuri | ................. | G10K 11/178 381/71.1 |
| 2004/0002858 A1 * | 1/2004 | Attias | ..................... | G10L 21/02 704/226 |
| 2008/0243504 A1 * | 10/2008 | Poi | ........................ | G10L 15/063 704/247 |
| 2010/0226505 A1 * | 9/2010 | Kimura | .............. | G10K 11/1788 381/71.6 |
| 2011/0046948 A1 * | 2/2011 | Pedersen | ............. | G10L 21/0208 704/231 |
| 2011/0145000 A1 * | 6/2011 | Hoepken | ................ | G10L 15/22 704/275 |
| 2012/0308022 A1 * | 12/2012 | Ookuri | ................. | G10K 11/178 381/71.1 |
| 2013/0345842 A1 * | 12/2013 | Karakaya | ................. | H04R 5/04 700/94 |
| 2014/0064511 A1 * | 3/2014 | Desai | ................... | H04R 1/1041 381/74 |

(Continued)

*Primary Examiner* — Khai N Nguyen
(74) *Attorney, Agent, or Firm* — Sutherland Asbill & Brennan LLP

(57) ABSTRACT

Aspects of the disclosure provide suspension of noise cancellation at a noise-cancelling device using keyword spotting. In one aspect, a predetermined word or phrase can be spotted within an utterance received at the noise-cancelling device, and in response, noise cancellation can be suspended or otherwise terminated. The predetermined word or phrase can be specific to an end-user that utilizes the noise-cancelling device and/or a person that interacts with the end-user. In another aspect, interaction between an operator and the noise-cancelling device can be monitored after noise cancellation is suspended, and based at least on such interaction, a model for keyword spotting can be refined. In certain aspects, noise cancellation at the noise-cancelling device can be suspended or otherwise terminated in response to receiving a suspension directive via an electronic non-audio signal, for example, from a peripheral device. In other aspects, the noise-cancelling device can resume noise cancellation in response to a control signal.

21 Claims, 6 Drawing Sheets

(56) References Cited

U.S. PATENT DOCUMENTS

2014/0081631 A1* 3/2014 Zhu ..................... G10L 21/0208 704/226

2015/0195646 A1* 7/2015 Kumar ................. G10K 11/178 381/71.8

* cited by examiner

SUSPENDING NOISE CANCELLATION USING KEYWORD SPOTTING

BACKGROUND

Noise-cancelling headphones typically permit consuming audio in noise-intensive or otherwise noise-hostile environments, such as a busy street or a vehicle having a noisy cabin. As such, the operator of the noise-cancelling headphones tends to be at least acoustically isolated from the environment, and therefore, including the operator in a discussion with another party or otherwise attracting the operator's attention can be difficult or otherwise inconvenient.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
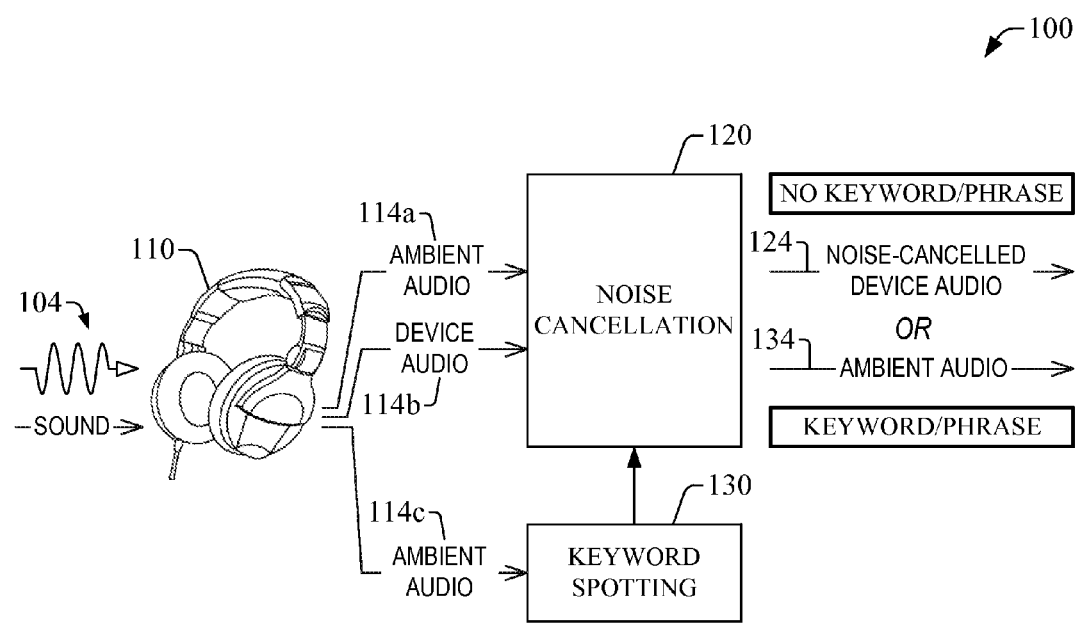
FIG. 1 illustrates an example of an operational environment for suspending noise cancellation in accordance with one or more aspects of the disclosure.

The disclosure recognizes and addresses, in at least certain aspects, the issue of acoustic isolation of an operator of a noise-cancelling device. More particularly, yet not exclusively, the disclosure recognizes the difficulty or inconvenience associated with situations in which it may be necessary or otherwise desirable to attract the attention of such an operator. In accordance with aspects of this disclosure, a noise-cancelling device (e.g., a noise-cancelling headphone or earbud) can include computing resources, such as one or more processors and one or more memory devices, and communication resources, such as communication devices (e.g., a system bus, a memory bus, or the like), input/output interface(s), and/or a radio unit. Accordingly, the noise-cancelling devices disclosed herein can be embodied in wireless computing devices (e.g., mobile computing devices, including portable and/or wearable computing devices) or tethered computing devices. As described in greater detail below, the disclosure provides embodiments for suspending noise cancellation in a noise-cancelling device based at least on keyword recognition. In one aspect, a keyword in an utterance received at a noise-cancelling device can be recognized as a predetermined word or phrase, and in response, noise cancellation at the noise-cancelling device can be suspended or otherwise terminated. In one example, recognition of one or more keywords (e.g., words or phrases) in an utterance can leverage approaches or techniques specific to identification or spotting of keywords (e.g., words or phrases), as opposed to relying on full-fledged speech recognition. Accordingly, in at least certain embodiments, keyword recognition may be referred to as keyword spotting. The utterance in accordance with aspects of the disclosure can contain a predetermined keyword (e.g., a predetermined word or a predetermined phrase (such as more than one predetermined words)), and can be specific to an end-user that utilizes the noise-cancelling device and/or another person that interacts with the end-user. As such, in one aspect, the disclosure contemplates speaker identification in addition to keyword spotting. In addition, although an utterance may contain a predetermined keyword, noise cancellation may not be suspended unless the predetermined keyword is uttered by a specific human speaker. It should be appreciated that in the present disclosure the term "keyword" can refer to a word (such as "Hey") or a phrase (e.g., "Hey Ben"), and therefore, keyword spotting as described herein is not limited to identification of a single word, but it can contemplate identification of a phrase.

In another aspect, interaction of an end-user with the noise-cancelling device can be monitored after noise cancellation is suspended. The interaction can convey a response of the end-user to suspension of noise cancellation. For instance, the end-user may turn noise-cancellation back on nearly immediately after suspension thereof. Such interaction may indicate a false-positive detection of a predetermined keyword, which can suggest that improvement to a model for keyword spotting may be desirable. Accordingly, the model for keyword spotting can be refined based at least on the monitored interaction. In certain aspects, noise cancellation at the noise-cancelling device can be suspended or otherwise terminated in response to receiving a suspension directive via an electronic non-audio signal, for example, from a peripheral device. In other aspects, the noise-cancelling device can resume noise cancellation in response to a control signal (an audible signal, an inaudible tone, or an electronic non-audio signal). In contrast with certain conventional technologies, the disclosure can permit transitions between noise cancellation and passthrough operation without active engagement (e.g., actuation of an on/off switch) of the operator of the noise-cancelling device. In addition, by relying upon or otherwise leveraging user-defined keywords or phrases, the need for active engagement with, or input from, the operator of the noise-cancelling device can be largely mitigated or otherwise avoided, therefore rendering the noise-cancelling device more useful in environments where it is desirable to include the operator in discussions, or otherwise attract the operator's attention.

With reference to the drawings, FIG. 1 illustrates an example operational environment 100 for noise cancellation management in accordance with one or more aspects of the disclosure. A noise-cancelling device 110, which is represented for the sake of illustration with a noise-cancelling headphone, can receive an input signal 104 that can contain ambient sound (represented as "sound" in FIG. 1) and can perform noise cancellation on such a signal in order to provide an output signal that substantially removes at least a portion of the ambient sound. In addition, in certain scenarios, the input signal 104 can include input audio, such as music or other type of audio recording (in either digital or analog format), intended for consumption via the noise-cancelling device 110. As such, in one aspect, the noise-cancelling device 110 can generate a first audio signal (represented as ambient audio 114a in FIG. 1) representative of at least a portion of the input signal 104 received at the noise-cancelling device 110, and a second audio signal (represented as device audio 114b in FIG. 1) representative of the input audio received at the noise-cancelling device 110. The noise-cancelling device 110 can provide or otherwise communicate the first and second audio signals to a noise cancellation stage 120 (which also may be referred to as a "noise cancellation loop") in order to remove at least a portion of the ambient sound conveyed in the input signal 104. In one example, the noise cancellation stage 120 can reverse at least a portion of the ambient audio 114a—e.g., the frequency-dependent phase of the audio signal can be shifted by a magnitude substantially equal to $\pi$—and can generate or otherwise compose an output audio signal that can include the reversed ambient audio, the ambient audio 114a, and the device audio 114b. Accordingly, in one aspect, the output audio signal can convey audio that substantially lacks the ambient sound received via the input signal 104. Such an output signal may be herein referred to as noise-cancelled device audio 124, and can have small amplitudes at respective frequencies of the ambient sound depending on the performance (also referred to as spectral quality) of the noise cancellation stage 120.

Based at least on the performance of the noise cancellation stage 120, certain ambient sound that may be intended to elicit a response from an operator of the noise-cancelling device 110 may be cancelled in the noise cancellation stage 120, and thereby, the operator may not respond as expected or otherwise desired. In at least certain scenarios, ambient sounds that may be intended to elicit a response can include specific keywords, such as specific words or phrases, such as "greetings," "hey," "hello," "Ben," "hello Ben," "hey Ben," "lunch time," "meeting time," or the like, that can be directed to attract the attention of an end-user of the noise-cancelling device 110. Accordingly, in one aspect, the noise-cancelling device 110 can generate an audio signal, represented as ambient audio 114c in FIG. 1, that can be provided to a keyword spotting stage 130. In one aspect, the keyword spotting stage 130 can analyze the ambient audio 114c and may identify or otherwise determine the presence of a specific keyword, such as a specific word (e.g., "Hey") or a specific phrase (e.g., "Hey Ben"), within the ambient audio 114c. In response to such identification or determination, the keyword spotting stage 130 can signal or otherwise instruct the noise cancellation loop 120 to cease (e.g., suspend or cease) noise cancellation of the ambient audio 114a, and termination of delivery of the device audio 114b when supplied to the noise-cancelling device 110. Accordingly, the noise-cancelling device 110 can permit communication (e.g., output or delivery) of ambient sound received at the noise-cancelling device 110. In the illustrated operational environment 100, the signaling that conveys a directive to suspend noise-cancellation is represented with an arrow connecting the keyword spotting stage 130 to the noise cancellation stage 120. In addition, the ambient sound that can pass through the noise cancellation stage 120 in response to a predetermined keyword(s) being present in the input signal 104 is referred to as ambient audio 134.

Therefore, in the illustrated operational environment 100, the noise-cancelling device 110 can switch between noise cancellation and operation as a sound passthrough element (which herein may be referred to as "passthrough operation") in response to determination (herein also referred to as detection or identification) of a predetermined keyword or a predetermined phrase in the ambient sound that is received at the noise-cancelling device 110. As such, the predetermined keyword (e.g., a predetermined word or phrase) may be referred to, respectively, as a "sleepword" or a "sleephrase" for noise cancellation in that presence of the predetermined keyword (e.g., a predetermined word or phrase) can cause the noise-cancelling device 110 to suspend or otherwise terminate noise cancellation.

After a transition to passthrough operation, the noise-cancelling device 110 can monitor interaction of an end-user with the noise-cancelling device 110. The interaction can include, for example, communication of aural cues or non-aural indications from the end-user to the noise-cancelling device 110. In one aspect, an aural cue can be embodied or can include a specific keyword(s) intended to cause the noise-cancelling device 110 to resume noise cancellation. As such, in one aspect, the aural cue or the keyword(s) associated therewith (e.g., "resume cancelling, "cancel," or "continue") may be referred to as a "wakeword" or a "wakephrase" for noise cancelling in that the noise-cancelling device 110 can transition from passthrough operation to noise cancellation in response to the aural cue or the associated keyword(s). Accordingly, in one aspect, the keyword spotting stage 130 can continue to analyze or otherwise monitor the sound that is received within the input signal 104 in order to determine or otherwise identify the presence of a wakeword or a wakephrase.

Figure 2:
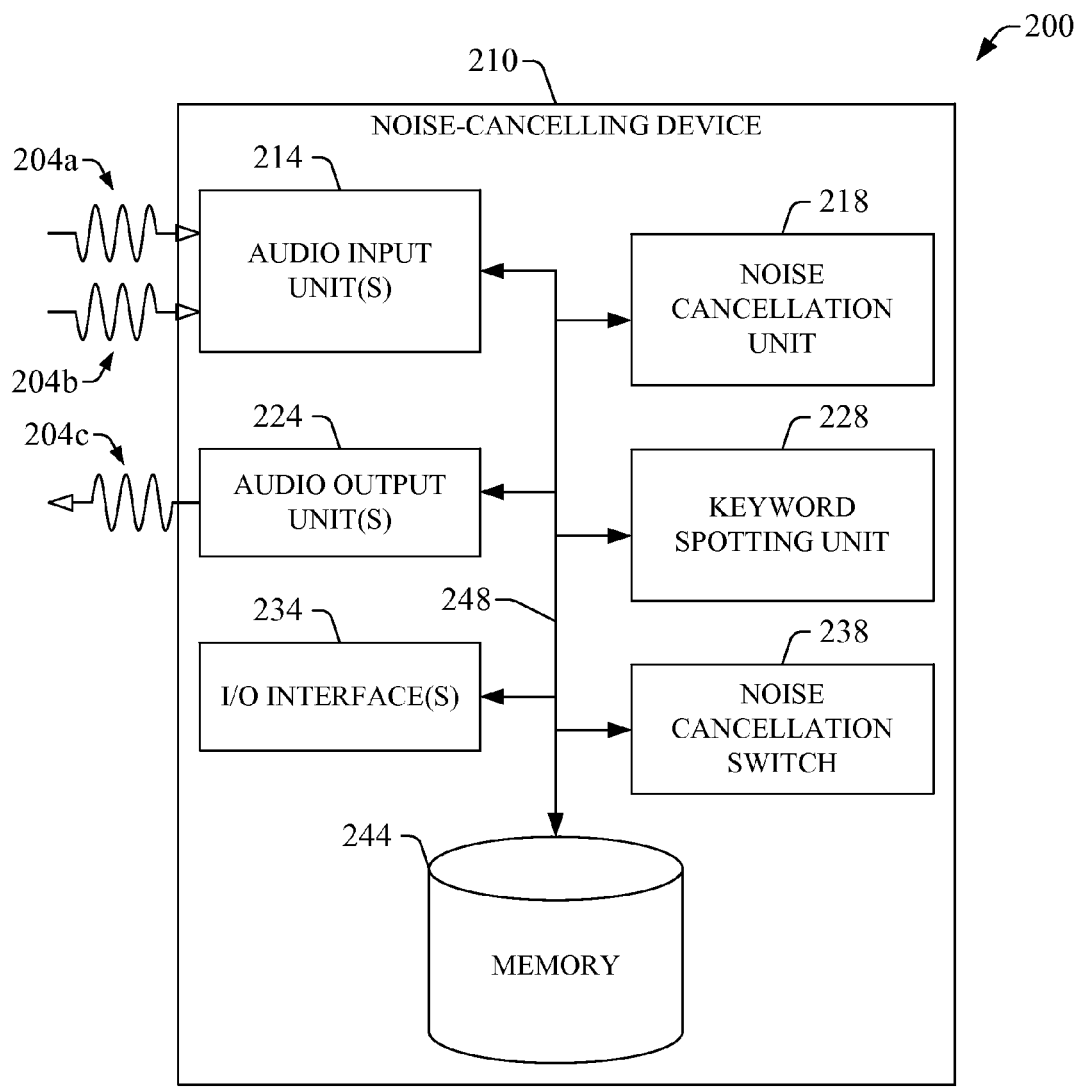
FIG. 2 illustrates an example of a noise-cancelling device in accordance with one or more aspects of the disclosure.

FIG. 2 presents an example embodiment 200 of an example noise cancelling device 210 for noise cancellation management in accordance with one or more aspects of the disclosure. As an illustration, the noise-cancelling device 210 can be embodied in or can comprise a headphone, a noise-cancelling earbud, or a portable noise-cancelling apparatus. In certain embodiments the portable noise-cancelling apparatus can be mechanically attached to a surface, such as a desk surface, a window surface, or the like. The illustrated noise-cancelling device 210 can include one or more audio input units 214 (referred to as audio input unit(s) 214) that can receive an external audio signal 204a. As described herein, the external audio signal 204a can convey ambient sound, including speech audio and/or non-speech audio (such as noise (natural, non-natural, or both), music, combinations thereof, or the like). It should be appreciated that, in certain aspects, the external audio signal 204a may be received during certain interval(s) of time or continuously or nearly continuously. In addition, in certain scenarios, at least one of the audio input unit(s) 214 can receive an audio signal 204b (digital and/or analog) that can communicate audio intended for consumption via the noise-cancelling device 210. The audio signal 204b can be received, for example, during certain interval(s) of time. In one example, the audio input unit(s) 214 can include microphone(s), analog-to-digital converter(s), amplifier(s), filter(s), and/or other circuitry for processing of audio (e.g., equalizer(s)). As such, in one aspect, a microphone included in the audio input unit(s) 214 can receive an audible signal constituting the external audio signal 204a. In addition, one or more of the audio input unit(s) 214 can generate audio signals (e.g., ambient audio 114a, device audio 114b, and ambient audio 114c) and can communicate or otherwise convey at least one audio signal of the generated audio signals to a noise cancellation unit 218, and at least one second audio signal to the keyword spotting unit 228. In one aspect, in connection with the example operational environment 100, the noise cancellation unit 218 can implement the noise cancellation stage 120, and the keyword spotting unit 228 can implement the keyword spotting stage 130. More specifically, yet not exclusively, the noise cancellation unit 218 can process the at least one audio signal in order to produce a noise-cancelled audio output (e.g., noise-cancelled device audio 124) that may be delivered via at least one of the audio output unit(s) 224. As an illustration, the audio output unit(s) 224 can include speaker(s); digital-toanalog converters; volume control(s) and/or other audio controls, such as bass control, treble control, and the like; an on/off switch; a combination thereof; or the like.

In addition, the keyword spotting unit 228 can process the at least one second audio signal (e.g., ambient audio 114*c*) in order to identify or otherwise detect the presence of a predetermined keyword or a predetermined phrase (e.g., more than one predetermined keywords in certain order). As such, in one aspect, the keyword spotting unit 228 can apply a keyword model to the at least one second audio signal. As described herein, in one aspect, the keyword model (e.g., a hidden Markov model (HMM) and/or a Gaussian mixture model) is directed to representing one or more predetermined keywords, such as "Hey Ben," and predicting or otherwise providing a likelihood that observed audio input (e.g., audio collected by a microphone included in the audio input unit(s) 214) contains or otherwise conveys the one or more predetermined keywords. In one example implementation, the keyword model can be contained (e.g., stored or otherwise encoded) in the keyword spotting unit 228. Therefore, in one aspect, the keyword spotting unit 228 can determine a likelihood that the at least one second audio signal conveys a predetermined keyword or predetermined phrase, such as "Hey Ben." Based at least on such likelihood, the keyword spotting unit 228 can determine or otherwise establish, with certain confidence, whether or not the predetermined keyword or predetermined phrase is conveyed in such signal(s).

A determination that a predetermined keyword is not conveyed in the external audio signal 204*a* can cause the noise-cancelling device 210 to continue noise cancellation. More specifically, in such scenario, the noise cancelation unit 218 can generate a noise-cancellation signal (e.g., a π-off-phase replica of the external audio signal 204*a*) in order to cancel the external audio signal 204*a*. Further, the noise cancellation unit 218 can combine the noise-cancellation signal with at least a portion of the external audio signal 204*a*, and can communicate the combined signal to at least one audio output unit of the audio output unit(s) 224. In response to the received combined signal, the at least one audio output unit (e.g., at least one speaker) can generate an audible signal (or audio) that can be delivered as output audio 204*c*. In the alternative, a satisfactory affirmative determination that the predetermined keyword is conveyed in the received external audio signal 204*a* can cause a noise cancellation switching unit 238 (which may also be referred to as noise cancellation switch 238) to signal or otherwise direct (e.g., communicate a control instruction to) the noise cancellation unit 218 to suspend or otherwise terminate noise cancellation on the audible signal that is received at the noise-cancelling device 210. Accordingly, as described herein, the predetermined keyword (e.g., "Ben") can function as a sleepword for noise cancellation by the noise-cancelling device 210. In response to the sleepword, at least one of the audio output unit(s) 224 (e.g., at least one speaker) can communicate output audio 204*c* that is substantially the same as the received external audio signal 204*a*. As an example, the output audio 204*c* can be embodied in or can include an audible signal generated by a speaker included in the audio output unit(s) 224. In certain embodiments, the noise cancellation switch 238 can constitute a control unit (not depicted in FIG. 2).

In addition, the keyword spotting unit 228 can continue to analyze or otherwise monitor the external audio signal 204*a* in order to determine or otherwise identify the presence of a wakeword or a wakephrase that can direct the noise-cancelling device 210 to transition from passthrough operation to noise cancellation. Further or as an alternative, as described herein, the keyword spotting unit 228 or a monitoring unit (not depicted in FIG. 2) can monitor interaction between an end-user with the noise-cancelling device 210 after or upon transitioning to passthrough operation. The noise-cancelling device 210, via such a monitoring unit, for example, can retain information representative of the monitored interaction in one or more memory devices 244 (which is represented as memory 244). In one example, at least a portion of such information can be acquired from the noise-cancelling device 210, via at least one of the input/output (I/O) interface(s) 234, for example, in order to improve a keyword model relied upon or otherwise utilized by the noise-cancelling device 210 for detection of a wakeword or a sleepword. The I/O interface(s) 234 can include at least one port (serial, parallel, or both), at least one Ethernet port, at least one pin, and can permit communication of information between the noise-cancelling device 210 and an external device, such as another computing device (e.g., a remote network device or an end-user device).

In certain implementations, the at least one of the I/O interface(s) 234 can receive or otherwise access information (which herein may be referred to as configuration input) that can configure one or more aspects of a keyword model in accordance with aspects of this disclosure. In one aspect, at least a portion of such information can configure the keyword spotting unit 228 to detect keywords with a specific sensitivity. For instance, the noise-cancelling device 210 can be configured to detect with higher sensitivity keywords associated with a first person (e.g., a work colleague of an end-user operating the noise-cancelling device 210) than keywords associated with a second person (e.g., a second work colleague). Therefore, in one aspect, the keyword model can be specific to a human speaker (or a person), which the noise-cancelling device 210 can recognize. To at least such an end, in one example, the keyword spotting unit 228 can perform spectral analysis on at least a portion of the external audio signal 204*a* in order to identify a group of frequencies characteristic of sound uttered by certain speaker. More specifically, in one embodiment, the keyword model can include a predetermined set of frequencies associated with the human speaker or a speaker profile (or other information structure; not depicted in FIG. 2) of the human speaker. In one example, the speaker profile, or an information structure indicative or representative thereof can be retained in the memory 244. In addition, the keyword spotting unit 228 can compare the outcome of the spectral analysis of at least a portion of the external input signal 204*a* with such a set of frequencies in order to recognize the human speaker. As such, the keyword spotting unit 228 can determine the human speaker that utters at least a portion of the external audio signal 204*a*, in addition to determining whether or not at least the portion of the external audio signal 204*a* includes a predetermined keyword (e.g., a predetermined word or a predetermined phrase). It should be appreciated that in certain embodiments, the spectral analysis of at least a portion of the external audio signal 204*a* can be performed by the noise cancellation unit 218, and results of the analysis can supplied or otherwise communicated to the keyword spotting unit 228.

It should be appreciated that, in certain embodiments, each of the noise cancellation unit 218, the keyword spotting unit 228, and the noise cancellation switch 238 (or a controller that contains such a switch) can be embodied in or can include an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed or otherwise configured to perform the functions described herein. While the noise cancellation unit 218 and the keyword spotting unit 228 are illustrated as separate in the noise-cancelling device 210, such units can be integrated into a single unit (e.g., a single chipset or circuitry) that can provide the functionality of such units in accordance with aspects described herein. Similarly, in certain embodiments, the keyword spotting unit 228 and the noise cancellation switch 238 also can be integrated into a single unit (e.g., a single chipset circuitry) that can provide the functionality of such units in accordance with aspects described herein. In addition, a bus platform 248 (depicted with multi-directional arrows in FIG. 2) can permit the exchange of information between two or more of the functional elements of the noise-cancelling device 210. The bus platform 248 can include a system, a memory bus, a combination thereof, or the like.

Figure 3:
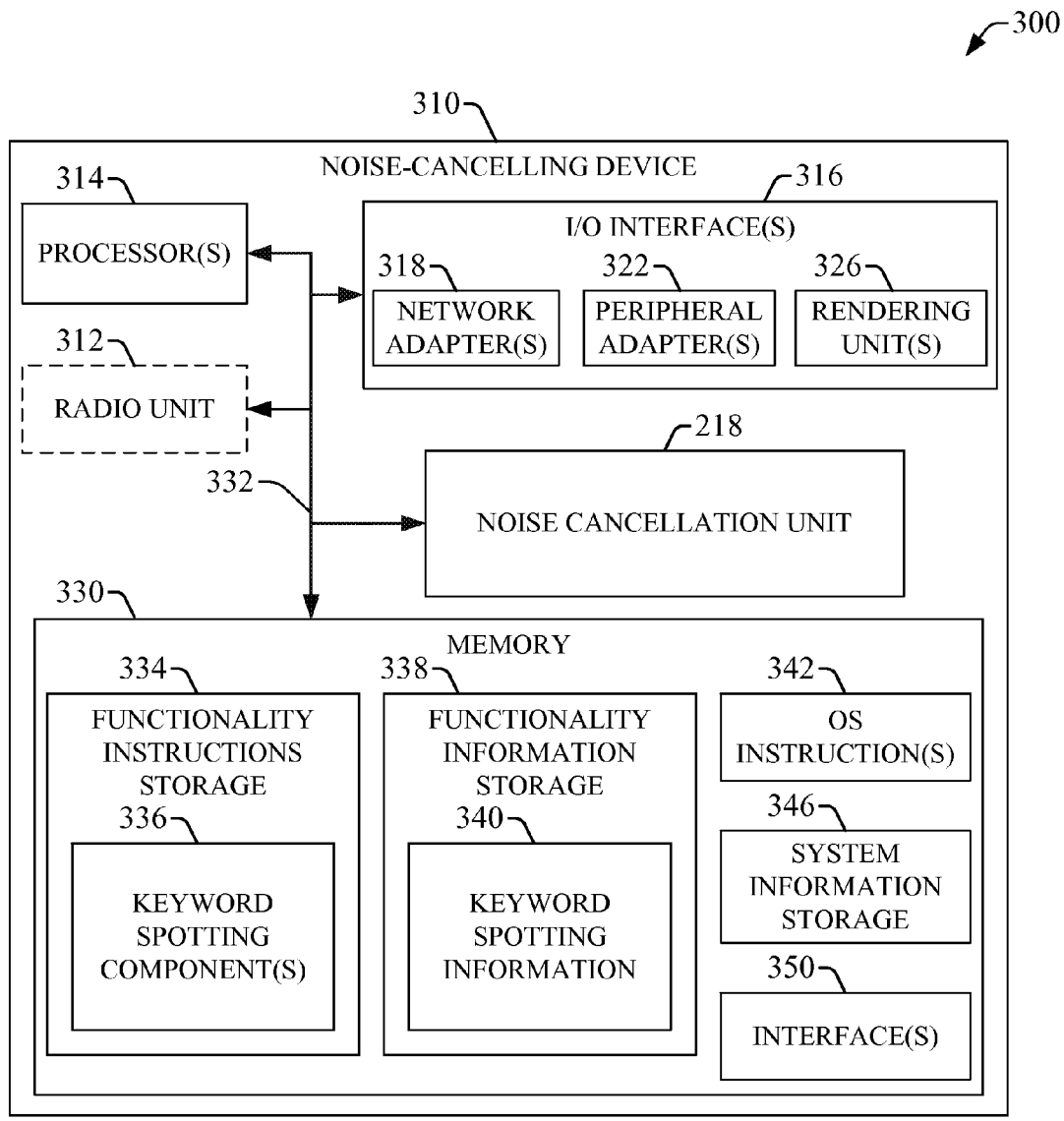
FIG. 3 illustrates another example of a noise-cancelling device in accordance with one or more aspects of the disclosure.

FIG. 3 illustrates an example embodiment 300 of a noise-cancelling device 310 for noise cancellation management in accordance with one or more aspects of the disclosure. As illustrated, the example noise-cancelling device 310 represents an example implementation of the various aspects or features of the disclosure in which the processing or execution of operations described in connection with noise cancellation management disclosed herein can be performed in response to execution of one or more software components at the noise-cancelling device 310. It should be appreciated that the one or more software components can render the noise-cancelling 310, or any other computing device that contains such components, a particular machine for noise cancellation management as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example methods presented in FIGS. 5-6. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the noise-cancelling device 310 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the noise-cancelling device 310 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with noise cancellation management described herein can comprise personal computers; server computers; laptop devices; handheld computing devices, such as mobile tablets or electronic-book readers (e-readers); wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the noise-cancelling device 310 can comprise one or more processors 314, one or more input/output (I/O) interfaces 316, a memory 330, and a bus architecture 332 (also termed bus 332) that functionally couples various functional elements of the noise-cancelling device 310. In certain embodiments, the noise-cancelling device 310 can include, optionally, a radio unit 312. The radio unit 312 can include one or more antennas and a communication processing unit that can permit wireless communication between the noise-cancelling device 310 and another device, such as a remote computing device (e.g., device 440) and/or a remote sensor. The bus 332 can include at least one of a system bus, a memory bus, an address bus, or a message bus, and can permit the exchange of information (data, metadata, and/or signaling) between the processor(s) 314, the I/O interface(s) 316, and/or the memory 330, or respective functional elements therein. In certain scenarios, the bus 332 in conjunction with one or more internal programming interfaces 350 (also referred to as interface(s) 350) can permit such exchange of information. In scenarios in which the processor(s) 314 include multiple processors, the noise-cancelling device 310 can utilize parallel computing.

The I/O interface(s) 316 can permit communication of information between the computing device and an external device, such as another computing device, e.g., a network element or an end-user device. Such communication can include direct communication or indirect communication, such as the exchange of information between the noise-cancelling device 310 and the external device via a network or elements thereof. As illustrated, the I/O interface(s) 316 can comprise one or more of network adapter(s) 318, peripheral adapter(s) 322, and rendering unit(s) 326. Such adapter(s) can permit or facilitate connectivity between the external device and one or more of the processor(s) 314 or the memory 330. For example, the peripheral adapter(s) 322 can include a group of ports, which can include at least one of parallel ports, serial ports, Ethernet ports, V.35 ports, or X.21 ports. In certain embodiments, the parallel ports can comprise General Purpose Interface Bus (GPIB), IEEE-1284, while the serial ports can include Recommended Standard (RS)-232, V.11, Universal Serial Bus (USB), FireWire or IEEE-1394. In certain embodiments, at least one of the I/O interface(s) 316 can embody or can include the I/O interface(s) 234, the audio input unit(s) 214, and/or the audio output unit(s) 224.

In one aspect, at least one of the network adapter(s) 318 can functionally couple the noise-cancelling device 310 to one or more remote computing devices or sensors (not depicted in FIG. 3) via one or more traffic and signaling pipes that can permit or otherwise facilitate the exchange of traffic and/or signaling between the noise-cancelling device 310 and such one or more remote computing devices or sensors. Such network coupling provided at least in part by the at least one of the network adapter(s) 318 can be implemented in a wired environment, a wireless environment, or both. The information that is communicated by the at least one of the network adapter(s) 318 can result from the implementation of one or more operations of a method in accordance with aspects of this disclosure. Such output can be any form of visual representation, including textual, graphical, animation, audio, tactile, and the like. In addition or in the alternative, depending on the architectural complexity of the noise-cancelling device 310, the rendering unit(s) 326 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the noise-cancelling device 310, or can permit conveying or revealing the operational conditions of the noise-cancelling device 310.

In one aspect, the bus 332 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like.

The noise-cancelling device 310 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the noise-cancelling device 310, and can comprise, for example, both volatile and non-volatile media, and removable and/or non-removable media. In one aspect, the memory 330 can comprise computer-readable media in the form of volatile memory, such as random access memory (RAM), and/or non-volatile memory, such as read-only memory (ROM).

The memory 330 can comprise functionality instructions storage 334 and functionality information storage 338. The functionality instructions storage 334 can comprise computer-accessible instructions that, in response to execution (by at least one of the processor(s) 314), can implement one or more of the functionalities of the disclosure. The computer-accessible instructions can embody or can comprise one or more software components illustrated as communication keyword spotting component(s) 336. In one scenario, execution of at least one component of the keyword spotting component(s) 336 can implement one or more of the methods described herein, such as example method 500 and/or example method 600. For instance, such execution can cause a processor (e.g., one of the processor(s) 314) that executes the at least one component to carry out a disclosed example method. It should be appreciated that, in one aspect, a processor of the processor(s) 314 that executes at least one of the keyword spotting component(s) 336 can retrieve information from or retain information in one or more memory elements 340 in the functionality information storage 338 in order to operate in accordance with the functionality programmed or otherwise configured by the keyword spotting component(s) 336. The one or more memory elements 340 may be referred to as keyword spotting information 340. Such information can include at least one of code instructions, information structures, or the like. For instance, at least a portion of such information structures can be indicative of a keyword model, profiles of persons related to an operator of the noise-cancelling device 310, and/or information indicative or otherwise representative of monitored interaction after a transition to passthrough operation.

In certain embodiments, one or more of the keyword spotting component(s) 336 can embody or can constitute at least one of the keyword spotting unit 228 or the noise cancellation switch 238, and can provide the functionality of such units in accordance with aspects of this disclosure. In other embodiments, one or more of the keyword spotting component(s) 336 in combination with at least one of the processor(s) 314 can embody or can constitute at least one of the keyword spotting unit 228 or the noise cancellation switch 238, and can provide the functionality of such units in accordance with aspects of this disclosure. It should be appreciated that while in the illustrated embodiment of the noise-cancelling device 310, the noise cancellation unit 218 is presented as a stand-alone functional component, in other embodiments, at least a portion of the noise cancellation unit 218 can be embodied in a combination of component(s) retained in the functionality instructions storage 334 and at least one of the processor(s) 314.

At least one of the one or more interfaces 350 (e.g., application programming interface(s)) can permit or facilitate communication of information between two or more components within the functionality instructions storage 334. The information that is communicated by the at least one interface can result from implementation of one or more operations in a method of the disclosure. In certain embodiments, one or more of the functionality instructions storage 334 and the functionality information storage 338 can be embodied in or can comprise removable/non-removable, and/or volatile/non-volatile computer storage media.

At least a portion of at least one of the keyword spotting component(s) 336 or the keyword spotting information 340 can program or otherwise configure one or more of the processors 314 to operate at least in accordance with the functionality described herein. One or more of the processor(s) 314 can execute at least one of the keyword spotting component(s) 336 and leverage at least a portion of the information in the functionality information storage 338 in order to provide noise cancellation management in accordance with one or more aspects described herein.

It should be appreciated that, in certain scenarios, the functionality instruction(s) storage 334 can embody or can comprise a computer-readable non-transitory storage medium having computer-accessible instructions that, in response to execution, cause at least one processor (e.g., one or more of the processor(s) 314) to perform a group of operations comprising the operations or blocks described in connection with the disclosed methods.

In addition, the memory 330 can comprise computer-accessible instructions and information (e.g., data, metadata, and/or programming code instructions) that permit or facilitate the operation and/or administration (e.g., upgrades, software installation, any other configuration, or the like) of the noise-cancelling device 310. Accordingly, as illustrated, the memory 330 can comprise a memory element 342 (labeled operating system (OS) instruction(s) 342) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the noise-cancelling device 310 can dictate a suitable OS. The memory 330 also comprises a system information storage 346 having data, metadata, and/or programming code that permits or facilitates the operation and/or administration of the noise-cancelling device 310. Elements of the OS instruction(s) 342 and the system information storage 346 can be accessible or can be operated on by at least one of the processor(s) 314.

It should be recognized that while the functionality instructions storage 334 and other executable program components, such as the OS instruction(s) 342, are illustrated herein as discrete blocks, such software components can reside at various times in different memory components of the noise-cancelling device 310, and can be executed by at least one of the processor(s) 314. In certain scenarios, an implementation of the keyword spotting component(s) 336 can be retained on or transmitted across some form of computer-readable media.

The noise-cancelling device 310 may include a power supply (not shown), which can power up components or functional elements within such devices. The power supply can be a rechargeable power supply, e.g., a rechargeable battery, and it can include one or more transformers to achieve a power level suitable for the operation of the noise-cancelling device 310 and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 318) to connect operationally to the conventional power grid. In another aspect, the power supply can include an energy conversion component, such as a solar panel, to provide additional or alternative power resources or autonomy for the noise-cancelling device 310.

It should be appreciated that, in certain embodiments, the noise-cancelling device 310 can operate in a networked environment by utilizing connections to one or more remote computing devices and/or sensors (not depicted in FIG. 3). As an illustration, a remote computing device can be a personal computer, a portable computer, a server, a router, a network computer, a peer device or other common network node, and so on. As described herein, connections (physical and/or logical) between the noise-cancelling device 310 and a remote computing device or sensor can be made via one or more traffic and signaling pipes, which can comprise wired link(s) and/or wireless link(s) and several network elements (such as routers or switches, concentrators, servers, and the like) that form a local area network (LAN), a wide area network (WAN), and/or other networks (wireless or wired) having different footprints. Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (e.g., network servers) that are functionally coupled (e.g., communicatively linked or otherwise coupled) through a network having traffic and signaling pipes and related network elements. In a distributed computing environment, in one aspect, one or more software components (such as program modules) may be located in both the noise-cancelling device 310 and at least one remote computing device.

Figure 4:
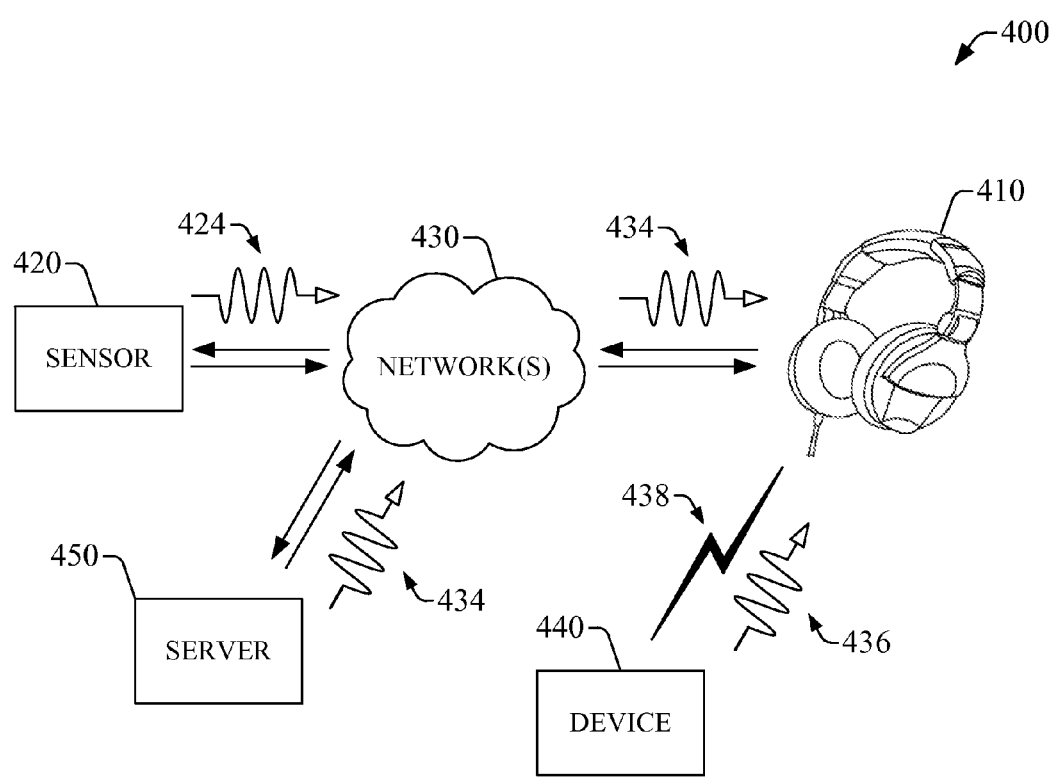
FIG. 4 illustrates an example of an operational environment for suspending noise cancellation in accordance with one or more aspects of the disclosure.

In certain embodiments, switching from noise cancellation to passthrough operation in a noise-cancelling device in accordance with aspects of this disclosure may be accomplished via a secondary electronic device functionally coupled (e.g., communicatively coupled) to the noise-cancelling device. In such embodiments, the secondary electronic device may utilize or otherwise leverage contextual information associated with the noise-cancelling device in order to generate a control instruction that can cause the noise-cancelling device to suspend noise cancellation. More specifically, FIG. 4 illustrates an example of an operational environment 400 for suspension of noise cancellation in which a noise-cancelling device 410 can switch between noise cancellation and passthrough operation via at least one of a sensor 420, a server 450, or an electronic device 440. As illustrated, the sensor 420, the server 450, and the electronic device 440 can be remote to the noise-cancelling device 410. In one scenario, the sensor 420 (e.g., a photodetector or camera, a motion sensor, a microphone, or the like) can probe an environment in which the noise-cancelling device 410 can operate. For instance, the sensor 420 can detect motion within the environment, illumination changes in the vicinity of the noise-cancelling device 410, and/or ambient sound in such an environment. As such, the sensor 420 can probe a condition of the environment or change in conditions thereof—e.g., opening of a door into the environment, alarm sound(s), light intensity or changes thereof in proximity of the noise-cancelling device, and/or presence of specific keywords in the environment. In response to a specific detected condition in the environment, the sensor 420 can convey a control signal 424 to a network of a group of networks 430, which can include wireless and/or wired communication networks having various footprints (e.g., a wide area network (WAN), a metropolitan area network (MAN), a local area network (LAN), a home area network (HAN), and/or a personal area network (PAN)). The control signal 424 can convey a control instruction for the noise-cancelling device 410 to suspend or terminate noise cancellation. Accordingly, such a network or a component thereof can communicate a control signal 434 indicative or otherwise representative of the control instruction. The noise-cancelling device 410 can receive (wirelessly or otherwise) the control signal 434 and, in response, can suspend or otherwise terminate noise cancellation. The control signals 424 and 434 can be embodied in or can include, for example, an electronic non-audio signal.

In certain embodiments, the sensor 420 can probe the environment of the noise-cancelling device 410 and, instead of detecting specific conditions of the environment, the sensor 420 can communicate information (digital or analog) indicative or otherwise representative of a condition of the environment to the server 450. The server 450 can receive the information and can analyze at least a portion of the received information. Based on an outcome of the analysis, such as presence of a predetermined keyword in ambient sound, the server 450 can communicate the control signal 434 to the noise-cancelling device 410 via a network of the network(s) 430.

Similarly, in one embodiment, an electronic device 440 that can be functionally coupled to the noise-cancelling device 410 via link(s) 438 (wireless link(s) or otherwise) can detect a predetermined keyword in accordance with aspects described herein and, in response, can communicate a control signal 436 that can convey to the noise-cancelling device 410 a control instruction to suspend or otherwise terminate noise cancellation. In one example, the control signal 436 can be embodied in or can include an inaudible tone. In addition or in the alternative, the electronic device 440 can utilize or leverage context information, such as a calendar event associated with an end-user operating the noise-cancelling device 410, or a likely activity of the end-user in order to determine that noise cancellation is to cease at the noise-cancelling device 410. In another embodiment, instead of relying upon direct communication (e.g., point-to-point wireless communication or tethered communication) with the noise-cancelling device 410, the electronic device 440 can leverage connectivity with a network of the network(s) 430 in order to convey the control signal 436. To at least such an end, in one aspect, the device 440 can communicate via a link (wireless or wireline; not depicted in FIG. 4) with such a network, and in response to detection of the predetermined keyword, the device 440 can communicate the control signal 436 to the network, or a component thereof, which can communicate the control signal 436 to the noise-cancelling device 410.

It can be appreciated that the noise-cancelling device 410 can have less complexity than the noise-cancelling device 210 and/or the noise-cancelling device 310 in view that the an external device (e.g., the sensor 420, the device 440, the server 450, and/or a component within one or more of the network(s) 430) can implement the processing associated with determining that a transition from noise cancellation to passthrough operation is to be performed. Yet, in certain implementations, the noise-cancelling device 410 may include or may be otherwise fitted with a radio unit and/or a network adapter in order to receive a control signal that can direct the noise-cancelling device 410 to suspend noise cancellation. As described herein, in at least certain aspects, the determination to suspend noise cancellation can be based on predetermined change(s) in the condition of an environment in proximity of the noise-cancelling device 410, and/or a predetermined keyword present in ambient sound within the environment. In addition, it should be understood and appreciated that, in certain embodiments, the control signal(s) that can direct the noise-cancelling device 410 to suspend or otherwise terminate noise cancellation may be electronic non-audio signals and/or inaudible tones.

Figure 5:
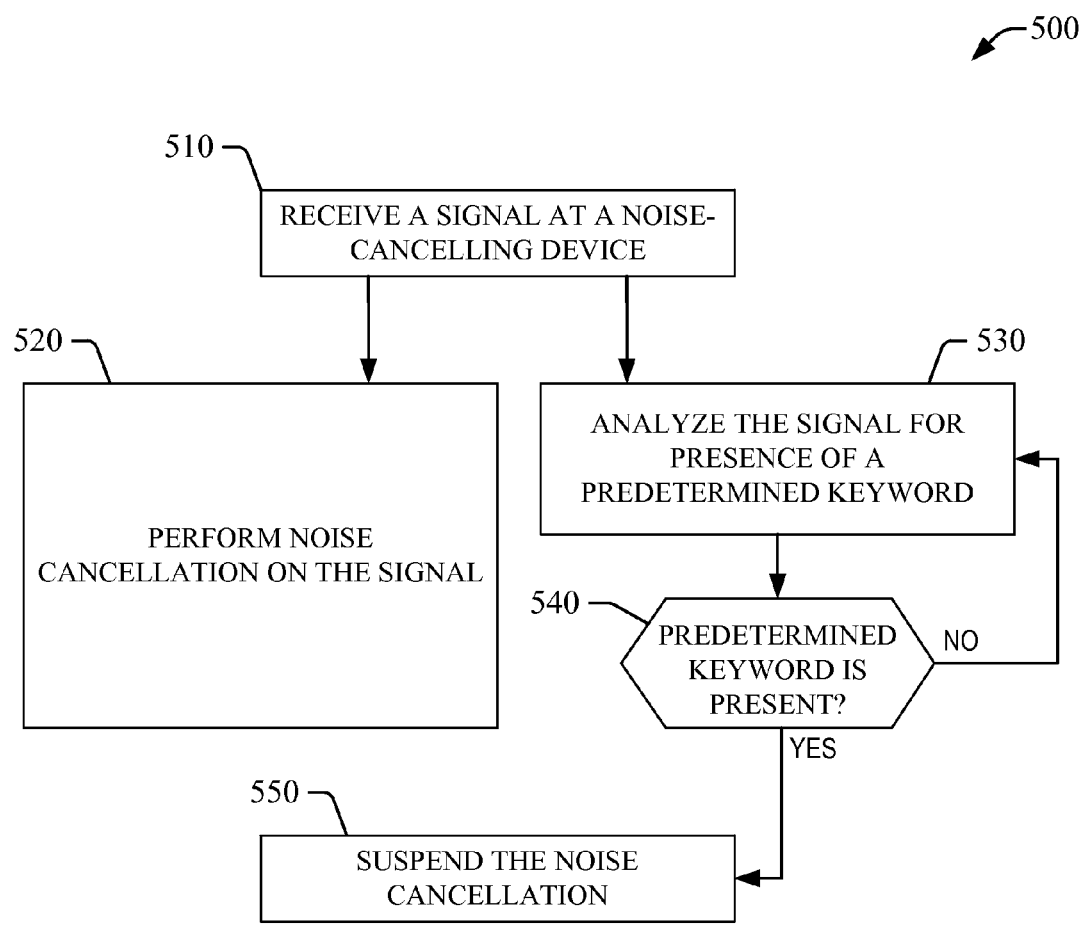
FIGS. 5-6 illustrate examples of methods for suspending noise cancellation in accordance with one or more aspects of the disclosure.
Figure 6:
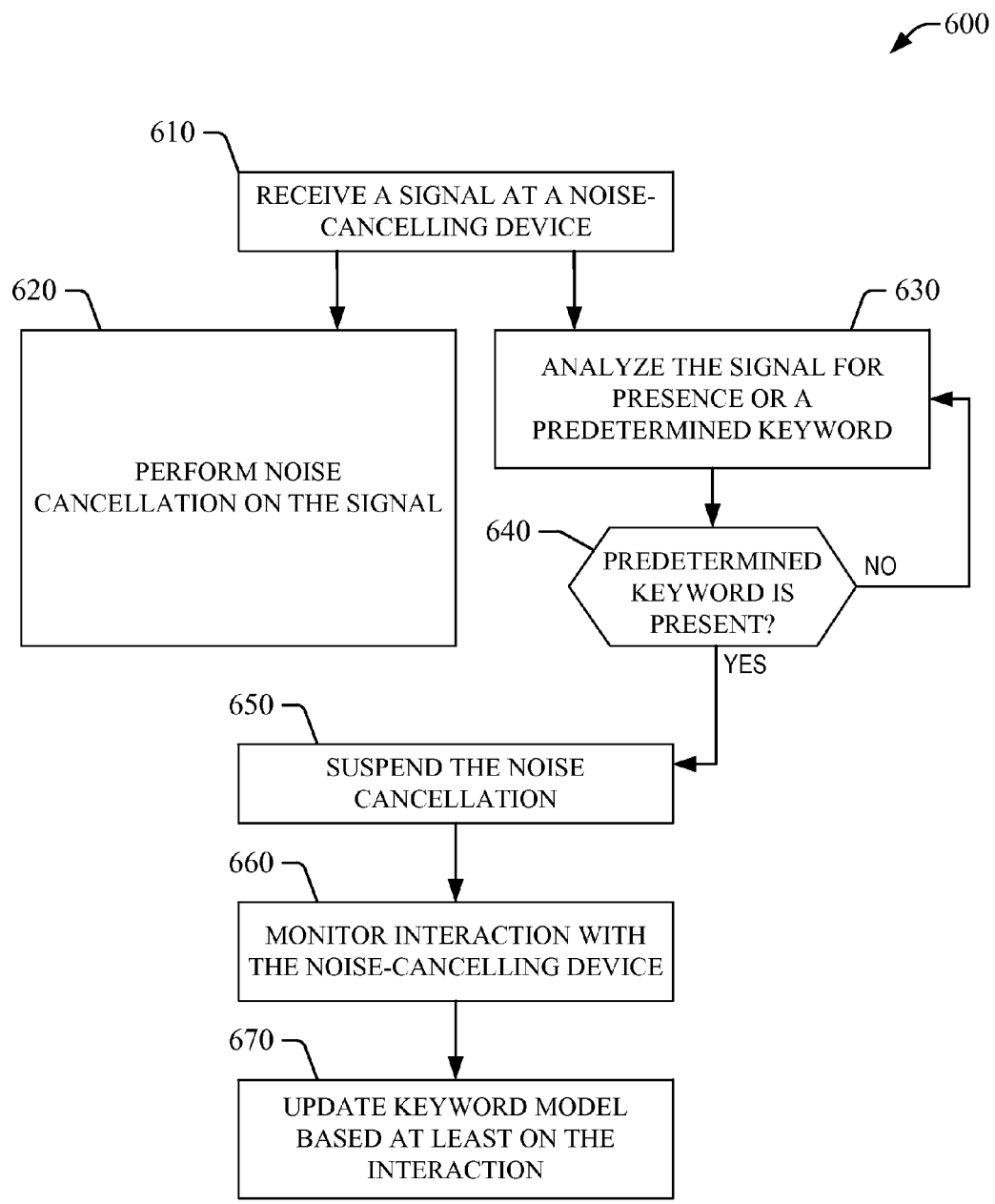

In view of the aspects described herein, example methods that can be implemented in accordance with the disclosure can be better appreciated with reference, for example, to the flowcharts in FIGS. 5-6. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods in accordance with this disclosure can be retained on an article of manufacture, or computer-readable medium, to permit or facilitate transporting and transferring such methods to a computing device (such as a noise-cancelling device, a blade computer, a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement one or more of the disclosed methods. The code instructions can provide a computer-executable or machine-executable framework to implement the methods described herein.

FIGS. 5-6 present flowcharts of example methods for noise cancellation management according to at least certain aspects of the disclosure. In certain embodiments, a noise-cancelling device (e.g., a noise-cancelling headphone, a noise-cancelling earbud, or a portable noise-cancelling apparatus) having one or more processors or being functionally coupled to at least one processor can implement (e.g., compile, execute, compile and execute, or the like) one or more blocks of the example method 500 and/or the example method 600. In one scenario, for example, the noise-cancelling device 210 can implement the subject example method. In other embodiments, the noise-cancelling device 310 can implement the subject example method. In yet other embodiments, one or more blocks of the example method 500 and/or the example method 600 can be implemented in a distributed fashion by two or more computing devices (e.g., a noise-cancelling device and a remote computing device) contained in an operational environment in accordance with aspects of this disclosure. Each of the two or more computing devices can have at least one processor or can be functionally coupled to at least one processor, where such processor(s) can implement at least one of the one or more blocks of the example method 500 and/or 600.

With reference to the example method 500, a signal can be received at a noise-cancelling device at block 510. The signal can be analog or digital, and in one example, can be audible and can convey sounds, such as speech, music, or a combination thereof. At block 520, noise cancellation can be performed on the signal. In one example, a first audio signal representative of the signal can be generated, and can be injected into or otherwise provided to a noise cancellation unit (e.g., noise cancellation circuitry) that may be integrated into the noise-cancelling device. In addition or in the alternative, the first audio signal can be communicated (e.g., transmitted) to a remote computing device (such as a server) that can implement noise-cancellation on the first audio signal. At block 530, the signal can be analyzed for the presence of a predetermined keyword. Accordingly, in one example, a second audio signal representative of the signal can be generated, and can be injected into or otherwise provided to a recognition unit, such as a keyword spotting unit (e.g., keyword spotting circuitry) that may be integrated into the noise-cancelling device (see, e.g., example embodiment 200 in FIG. 2). In addition or in the alternative, the second audio signal can be communicated (e.g., transmitted) to a remote computing device (such as a server) that can implement keyword spotting on the second audio signal. As described herein, as an illustration, a predetermined keyword may be embodied in terms such as "greetings," "hey," "hello," "Ben," or the like, and a predetermined phrase may be embodied in terms such as "hello Ben," "hey Ben," "lunch time," "meeting time," or the like. In one example, analyzing the second audio signal can include applying a keyword model to the second audio signal, where such a model can evaluate and/or provide the likelihood that the predetermined keyword is present within such a signal. As described herein, in certain implementations, the keyword model can include at least one of a hidden Markov model or a Gaussian mixture model. It should be appreciated that, in certain embodiments, the noise-cancelling device (via a unit therein, such as one of the audio input unit(s) 214, for example) can generate one or more of the first audio signal or the second audio signal. The first audio signal and/or the second audio signal can be embodied in or can include an analog signal or a digital signal.

At block 540, it can be determined if the predetermined keyword is present in the signal that is analyzed at block 530. In response to ascertaining or otherwise establishing a positive determination that the predetermined keyword is not present in the second audio signal, the analysis of received signal can be continued at block 530. In the alternative, in response to ascertaining or otherwise establishing a positive determination that the predetermined keyword is present in the second audio signal, noise cancellation can be suspended or otherwise terminated at block 550. Therefore, in one aspect, implementation of block 520 on the received signal can be suspended or otherwise terminated. In one embodiment, a noise cancellation switch integrated into or otherwise functionally coupled to the noise-cancelling device (e.g., noise-cancelling device 110 or 310) that implements the subject example method can signal to the noise cancellation unit of such a device that noise cancellation is to be suspended or otherwise terminated.

It should be appreciated that, blocks 530 and 540 may collectively embody a determination act or determination operation that permits establishing whether or not at least a portion of the received signal at block 510 includes the predetermined keyword. In addition, in certain embodiments, one or more human speakers (or persons) associated with the received signal can be recognized at block 530. Accordingly, at block 530, the noise-cancelling device that implements the subject example method 500 can perform spectral analysis of at least a portion of the received signal in order to identify one or more frequencies associated with or otherwise pertaining to a specific speaker. It should be appreciated that, in certain embodiments, a human speaker associated with the signal received at block 510 can be recognized before, after, or concurrently with the implementation of blocks 530 and 540. Further, in one or more of such embodiments, determination can be made as to whether or not the predetermined keyword has been uttered by a predetermined speaker prior to implementing block 550.

In connection with the example method 600, blocks 610-650 and their implementation are respectively similar or identical to blocks 510-550, which are described herein. At block 660, interaction with the noise-cancelling device (e.g., noise-cancelling device 110 or 310) that implements the subject example method can be monitored. For instance, the interaction of an operator with the noise-cancelling device in response to suspension or termination of noise cancellation can be monitored. More specifically, yet not exclusively, the time elapsed since suspension or termination of noise cancellation can be monitored. In one aspect, short times (e.g., about 500 ms) can indicate or otherwise convey a false positive in which the predetermined keyword may have been unsatisfactorily (e.g., erroneously) determined to be present in the received signal. At block 670, a keyword model (e.g., an HMM of a specific phrase, such as "Hey Ben") may be updated based at least on the monitored interaction. In certain embodiments, the noise-cancelling device that implements the subject example method can update the keyword model. In other embodiments, a computing device, such as a server, that is remote to the noise-cancelling device can update the keyword model.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., systems and methods) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, a special purpose computer, or another programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings; or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electro-mechanical coupling mechanisms (such as conduits, connectors, combinations thereof, or the like). An interface can include input/output (I/O) components as well as associated processor, application, and/or other programming components. The terms "component," "environment," "system," "architecture," "interface," "unit," "module," and "pipe" can be utilized interchangeably and can be referred to collectively as functional elements.

As utilized in this disclosure, the term "processor" can refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide suspension of noise cancellation at a noise-cancelling device using keyword spotting. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and the practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
    receiving a first external audio signal from a microphone of a noise-cancelling device;
    determining that the first external audio signal does not comprise a keyword corresponding to suspension of noise cancellation;
    generating a noise-cancellation signal for cancelling the first external audio signal;
    causing a speaker of the noise-cancelling device to generate audio corresponding to the noise-cancellation signal;
    receiving a second external audio signal from the microphone of the noise-cancelling device;
    determining that the second external audio signal comprises the keyword corresponding to suspension of noise cancellation;

facilitating presentation of at least a portion of the second external audio signal at the noise-cancelling device by suspending noise cancellation for at least the portion of the second external audio signal;

determining that a defined interaction with the noise cancelling device occurred, the defined interaction corresponding to an event to resume noise cancellation; and resuming the noise cancellation for at least a second portion of the second external audio signal.

2. The method of claim 1, further comprising receiving an input audio signal; and wherein causing a speaker of the noise-cancelling device to generate audio corresponding to the noise-cancellation signal comprises combining at least a portion of the input audio signal with the noise-cancellation signal, and causing the speaker to generate audio corresponding to the combined signal.

3. The method of claim 1, wherein the applying the keyword model comprises applying at least one of a hidden Markov model or a Gaussian mixture model.

4. The method of claim 1, further comprising further facilitating the presentation of at least the portion of the second external audio signal at the noise-cancelling device by causing the speaker to generate audio corresponding to at least the portion of the second external audio signal.

5. At least one non-transitory computer-readable medium comprising instructions, that when executed, cause a device to perform operations comprising:

receiving an external audio signal;

performing noise cancellation using a first portion of the external audio signal;

determining, using a keyword model, that a second portion of the external audio signal comprises a predetermined keyword;

causing the device to suspend noise cancellation for a third portion of the external audio signal;

determining occurrence of an interaction with the device to resume noise cancellation; and resuming noise cancellation for a fourth portion of the external audio signal.

6. The at least one non-transitory computer-readable medium of claim 5, wherein performing noise cancellation comprises generating a noise-cancellation signal for cancelling the first portion of the external audio signal, and causing a speaker of the device to generate audio corresponding to the noise-cancellation signal.

7. The at least one non-transitory computer-readable medium of claim 5, wherein the third portion of the external audio signal is after the second portion of the external audio signal.

8. The at least one non-transitory computer-readable medium of claim 5, wherein the determining the occurrence of the interaction comprises receiving an indication to restart noise cancellation, and the operation further comprising updating the keyword model in response to the indication.

9. The at least one non-transitory computer-readable of claim 6, the operations further comprising receiving an input audio signal; and wherein the causing the speaker of the device to generate audio corresponding to the noise-cancellation signal comprises combining at least a portion of the input audio signal with the noise-cancellation signal, and causing the speaker to generate audio corresponding to the combined signal.

10. The at least one non-transitory computer-readable medium of claim 5, wherein the predetermined keyword is associated with a person.

11. The at least one non-transitory computer-readable medium of claim 10, the operations further comprising recognizing the person by using at least one of the first portion of the external audio signal or the second portion of the external audio signal.

12. The at least one non-transitory computer-readable of claim 5, the operations further comprising causing the device to generate audio corresponding to the third portion of the external audio signal.

13. A noise-cancelling device, comprising:

an audio input unit configured to receive an external audio signal;

a noise cancellation unit configured to perform noise cancellation using a first portion of the external audio signal;

a keyword spotting unit configured to determine, using a keyword model, that a second portion of the external audio signal comprises a predetermined keyword;

a control unit configured to suspend noise cancellation for a third portion of the external audio signal; and a monitoring unit configured to determine occurrence of an interaction with the device to restart noise cancellation;

wherein the control unit is further configured to restart noise cancellation for a fourth portion of the external audio signal.

14. The noise-cancelling device of claim 13, wherein the noise cancellation unit is further configured to generate a noise-cancellation signal to cancel the first portion of the external audio signal, and to cause a speaker of the noise-cancelling device to generate audio corresponding to the noise-cancellation signal.

15. The noise-cancelling device of claim 13, wherein the third portion of the external audio signal is after the second portion of the external audio signal, and wherein the fourth portion of the external audio signal is after the third portion of the external audio signal.

16. The noise-cancelling device of claim 13, wherein to determine the occurrence of the interaction, the monitoring unit is further configured to receive an indication to restart noise cancellation.

17. The noise-cancelling device of claim 16, wherein a remote device updates the keyword model in response to the indication.

18. The noise-cancelling device of claim 14, wherein the audio input unit is further configured to receive an input audio signal; and the noise cancellation unit is further configured to combine at least a portion of the input audio signal with the noise-cancellation signal, and to cause the speaker to generate audio corresponding to the combined signal.

19. The noise-cancelling device of claim 13, wherein the predetermined keyword is associated with a person.

20. The noise-cancelling device of claim 19, wherein the keyword spotting unit is further configured to identify the person by performing a spectral analysis of at least one of the first portion of the external audio signal or the second portion of the external audio signal.

21. The noise-cancelling device of claim 13, wherein the noise-cancelling device comprises one of a noise-cancelling headphone, a noise-cancelling earbud, or a portable noise-cancelling apparatus.

* * * * *